Sept. 15, 1936.  T. B. TYLER  2,054,575

TRANSMISSION CONTROL MEANS

Filed Nov. 1, 1932  2 Sheets-Sheet 1

INVENTOR
Tracy Brooks Tyler
BY
ATTORNEY

Sept. 15, 1936.                 T. B. TYLER                 2,054,575
                          TRANSMISSION CONTROL MEANS
                          Filed Nov. 1, 1932        2 Sheets-Sheet 2
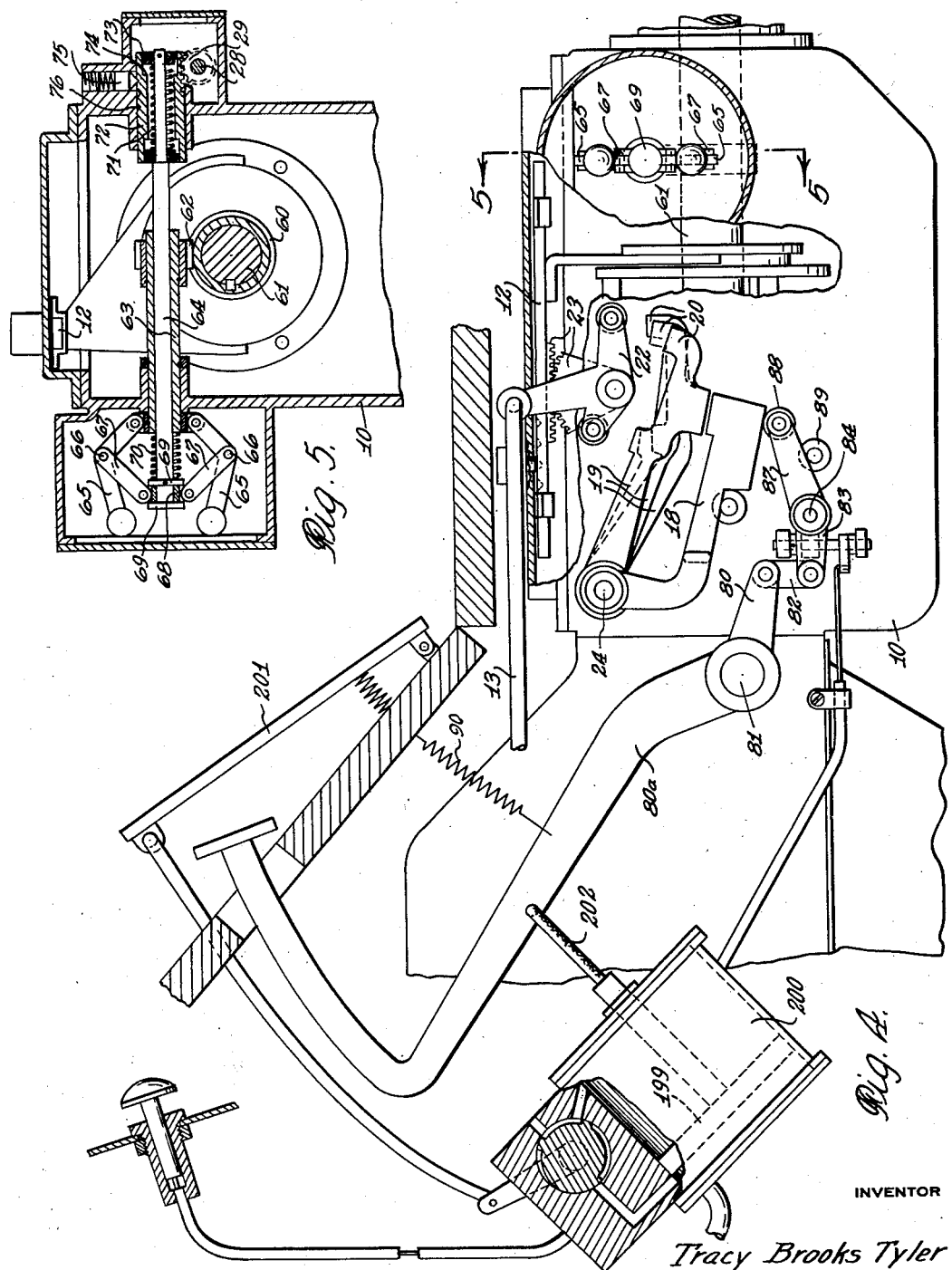
INVENTOR
Tracy Brooks Tyler
BY
ATTORNEYS Patented Sept. 15, 1936

2,054,575

UNITED STATES PATENT OFFICE 2,054,575

TRANSMISSION CONTROL MEANS

Tracy Brooks Tyler, Detroit, Mich., assignor to The Monopower Corporation, Detroit, Mich., a corporation of Michigan Application November 1, 1932, Serial No. 640,673

2 Claims. (Cl. 74—485)

This invention relates to transmission control means.

Transmissions are generally provided with various controls for the means for selecting and shifting the torque change parts thereof. One type of control, well known at present, is a full manual control, that is to say, both selection and shifting are manually controlled. A second type is a full automatic control, selection being automatically influenced by control means responding to the vehicle speed or torque, and shifting of preselected parts being accomplished automatically by suitable means. A third type, disclosed in my copending application Serial No. 614,945, filed June 2, 1932, is a semi-automatic control, that is to say, it is automatic in so far as selection is concerned, but is under personal control as to shifting.

A motor vehicle, if provided with a transmission control of the full automatic type or with one of the semi-automatic type generally is, and should be, provided with a full personal control as well, for reasons not here mentioned, and in addition, there should be, and generally is, provided in such a vehicle a change over means for connecting and disconnecting the full automatic or the semi-automatic control, at will, so as to render the transmission subject to the full personal control only, and not to the automatic control, if and when desired.

It often occurs to the operator to have selection temporarily or momentarily responsive to his own will, rather than to the vehicle speed or torque controlled selector influences. In heretofore known constructions, the only way for the operator to accomplish this result is for the operator to disconnect the automatic or semi-automatic control, so as to place the transmission under the personal control. He then has to select and shift through the medium of the personal control, after which, if he so desires, he may reconnect the automatic or semi-automatic control to place the transmission under such automatic or semi-automatic control once more.

Such action requires an involved series of operations, which militates to a degree, against the adoption of automatic or semi-automatic controls. It therefore appears desirable to provide means to enable the operator to impose his will on the selection means, temporarily or momentarily, without disconnecting the selection means from automatic control.

The principal object of the present invention, therefore is to provide means whereby the operator can substitute, on selection, his mental influence for the vehicle speed controlled selector influence or the influence that causes selection and that is controlled by the vehicle speed or torque, without disconnecting selection from the automatic or semi-automatic control and without compelling himself to resort to the direct or conventional manual movement of the torque change elements for effecting selection and shifting of these elements.

Still further objects of the invention will become readily apparent upon reference to the following detailed description of a preferred embodiment of the same and upon reference to the appended drawings, in which—

Fig. 4 shows parts of a selecting and shifting mechanism in elevation, and Fig. 5 is a cross section taken on line 5—5 of Fig. 4.

Figure 1:
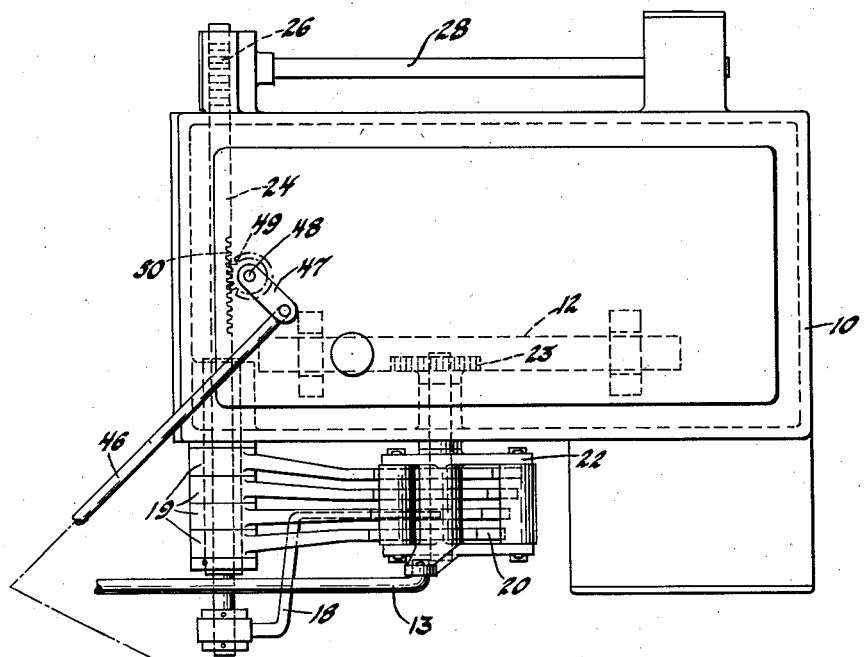
Figure 1 shows in plan an embodiment of the invention.
Figure 1:
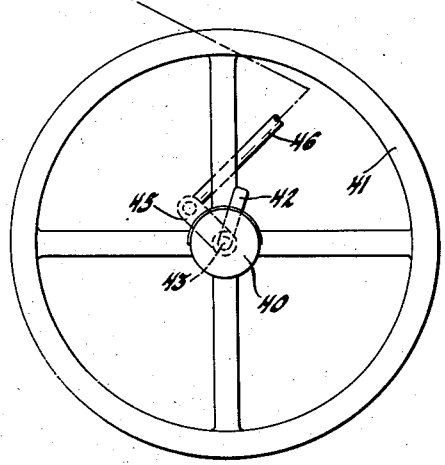
Figure 2:
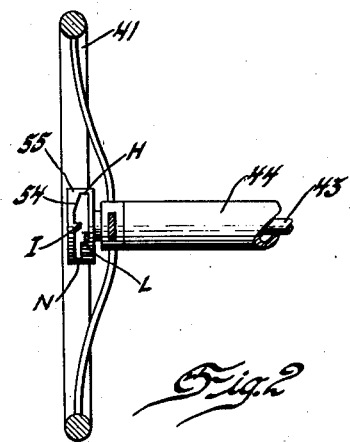
Figures 2 and 3 show parts thereof, in detail.
Figure 3:
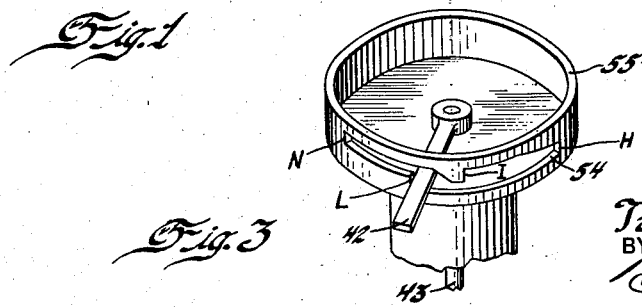

Referring to the drawings, it will be seen that there is shown a transmission casing 10, in the upper portion of which, and beneath the top cover whereof, is a shifter rail 12 movable longitudinally to select and create various groupings of the torque changing elements in the transmission. The shifter rail 12 may be moved longitudinally, (a) by means of a conventional shift lever (not shown), operating on the rail thru suitable means such as a rod 13 connected to a rocker arm 22 which functions as will hereinafter appear; and (b) by means of a selector and shifter arm 18 through an automatically selected one of a plurality of selectable arms 19 having yoked ends 20 adapted to be engaged by the end of the selector and shifter arm 18, the four yoked ends engaging, in different fashions, a rocker arm 22 operatively connected to the shifter rail by a gear sector and rack connection 23, the nature of the selection, that is to say, the particular one of the arms 19 to be engaged, being determined by the position of a transverse shaft 24 connected through a rack and pinion connection 26, and a rod 28, to a speed responsive device, controlled by the speed of the vehicle.

The shaft 28 has a pinion gear 29 mounted thereon and meshing with rack teeth formed on a slidable sleeve 72, the latter being connected to the end of a control actuator shaft 64. To rotate the rod 28 there is provided mechanism including a gear 60 on the propeller shaft 61 meshing with a gear 62 fixed to a non-slidable sleeve 63 journalling and rotating on the shaft 64. To one end of the sleeve 63 are pivotally connected the weighted arms 65 of a governor, these arms in turn being connected at 66 to links 67, which in turn are pivotally connected at 49 to a collar 68 rotatable on the shaft 64, the collar 68 being restrained against sliding movement by fixed collars 69 on shaft 64. A spring 70 tends to move the shaft 64 to the left, counteracting that influence of the arms 65 which tends to move shaft 41 to the right.

As the propeller shaft 61 rotates it causes rotation of the weighted arms 46 and the position assumed by these varies with the speed of the propeller shaft. As the governor arms move away from the shaft 41 they cause the latter to slide in its bearings until the compression spring 71, telescoped between the shaft 64 and the sleeve 72, is compressed sufficiently to permit washers 73 to engage shoulders 74 within the sleeve 72, whereupon the sleeve 72 will move, due to movement of shaft 64, against the restraining influence of a spring press check plunger 75, adapted to seat in one or another of the spaced notches 76 of the sleeve. This construction is provided so that sleeve 40 will not move gradually in response to variations in speed of the propeller shaft, but will move with a "snap" action, distances equal to the spacing of notches 76. The restraining plunger 75 and the notches 76 are spaced to correspond to the spacing of the shifting arms 19 and insure the lever 18 being moved into complete alignment with one or another of the shifting arms, and under two of them at one time.

The parts described immediately above constitute means for automatically determining selection and automatically correlating selection to the speed of the propeller shaft. Other parts constitute means for actuating the shifting part or rail for non-automatically shifting automatically preselected elements in the transmission. These include a short extension 80 on a pedal head lever 80a mounted on a shaft 81, the extension being connected by a link 82 to an arm 83 journalled on a stationary shaft 84 mounted on and projecting from the transmission casing 10. Also journalled on shaft 84 and connected to arm 83 is a lever 87 having an elongated roller 88 adapted to engage the under surface of selector lever 18. A stud 89 fixed to the casing 10 forms a stop for lever 87.

It will be seen that when the operator permits the lever 80a to be moved upwardly by spring 90, the lever 87 will be moved in a manner to move lever 18 against one or another of the automatically preselected shifter arms 19 and thereby to move the rail.

The lever 80a may be connected as at 202 to the movable part or plunger 199 of a power actuator 200, controlled by an actuator controller 201.

The construction thus far described forms no part of the present invention, being shown and disclosed in great particularity in application Serial No. 614,945.

The means mentioned in (a) of the foregoing constitutes a conventional manual control for selection and shifting. The means mentioned in (b) of the foregoing constitutes an automatic selection and semi-automatic shifting means.

It will be observed at this time that the cross shaft 24 is moved automatically by the influence that causes selection and that is controlled by the vehicle speed or torque, acting in this embodiment through a speed responsive device, and the connections aforesaid, to determine selection automatically and in correlation to the speed or torque of the vehicle. Since it is often desirable to inhibit the action of the influence or specifically, the action of the speed responsive device, and to effect selection in accordance with the will of the operator, rather than in accordance with the speed or load conditions, without at the same time disconnecting or rendering inoperable the automatic selection and semi-automatic shifting means, there is provided a device whose provision and construction forms the principal object of the present invention. The same will now be described.

The control means of the present invention may be mounted in any convenient place and preferably is mounted on the conveniently located hub 40 of a conventional steering wheel 41. The control means includes a control lever 42 keyed to a vertical rod 43, running through the steering column 44 and keyed at its lower end to a crank 45 which, in turn, is connected through a link 46 to a crank 47 journaled on a post 48, there being a segmental toothed pinion 49, in mesh with rack teeth 50 on shaft 24, rotatable by the crank 47 and therethrough by control lever 42.

It will be seen that when the control lever 42 is rotated, shaft 24 will be moved, regardless of the tendency of the influence or speed responsive device to move the same, to create a desired selection of the transmission torque change parts.

It will be clear from an understanding of the forgegoing description and the prior application, that since the actual shift is not automatic, the effecting of a selection does not shift the thus selected parts. However, the means including parts 42—50, inclusive, might well be used with an automatically actuated transmission, one wherein shifting, as well as selecting, is automatically effected.

In order to define various positions of the control lever 42 and thus define various selection relations between selector 18 and arms 19, the control lever 42 is mounted to be movable in a slot 54 of an annular collar 55 mounted adjacent the end of the steering column. The slot is so configured as to provide four defining points, N, L, I, and H and arranged to correspond with neutral or no drive, low speed or high torque drive, intermediate speed or intermediate torque drive, and high speed or low torque drive positions, the control lever being maintainable in any position by the operator against any one of the four defining points, N, L, I, or H in slot 54 opposition to the lever-moving tendency of the speed responsive device. The lever 42 is made of relatively springy metal designed to have a tendency to remain in the straight part of the slot, that is the part connecting the L and H positions, though of course other arrangements of these parts might well be suggested.

It will be observed at this time that the control lever may be moved manually by the operator without rendering the transmission control inoperable, and that the control lever merely inhibits the action of the influence that causes selection responsive to the speed or torque of the vehicle.

In order to show more clearly the ultimate operation and function of the control lever and associated parts, several examples of its operation will be given. Suppose it is desired to proceed at a very low speed without the transmission parts being moved out of high and into intermediate speed by the speed responsive device; under such conditions, the operator need merely hold the control lever 42 in the H part of slot 54, in opposition to the tendency of the speed responsive device to effect a change in the selection from high speed to a lower speed. By way of further example, suppose it is desired to proceed in intermediate gear but at a high speed as when climbing a hill; under such conditions, the operator, by holding the control lever in the I part of slot 54 can create a gear selection which differs from the one that the speed of the vehicle would create. Other examples of the use of the control lever might well be given, though they are here omitted since they would readily suggest themselves.

It will be noted at this time that since control lever 42 is continuously secured to the automatic selector part, shaft 24, it not only effects selection, but also, by its position, indicates the particular selection that exists at any time. This permits the operator to observe, at a glance, what selection happens to be in existence. If the control lever is not being manipulated by the operator, to oppose the vehicle speed controlled selector influence, it will be movable freely and will assume a position corresponding to the selection then effected by that influence.

It will further be observed that when the operator wishes to discontinue substituting his mental influence on selection for the vehicle speed controlled selector influence, all he need do is release lever 42, upon which release, the transmission will automatically and without further action, be once more under the automatic selection control.

Further, when the device of the invention is used, it affects selection only, leaving the shifting mechanism undisturbed. Accordingly when a power shift means is employed as described above and as in my application, 614,945, though selection may be personally controllable, through lever 42, the shift is still through a power means, just as is the case when selection is made through the automatic selection means.

Further, it will be observed that the operation of lever 42 is not only a simple matter, but is also accomplished very easily, since its movement is opposed only by the parts of the automatic selector mechanism. Lever 42 is not operatively connected to the shifter mechanism and is therefore not opposed by such mechanism, or by the influences of the transmission driving elements.

If it is desired, to shift the transmission parts into reverse by the power shift described above, reverse selection might well be provided for by providing the notched edge of slot 54 with a reverse stopping point, selectable only by the operator, when he desires reverse selection.

It will be observed that a neutral position marked N, is provided for lever 42. This position may be selected manually, by moving lever 42 thereinto, but is not selected automatically. This position is provided, however, so that the operator can place the transmission in neutral, though it still remains under the automatic selector control, as for example, when the engine is stopped, it being desirable to have the transmission in neutral before the engine is restarted. Otherwise, the operator would have to disengage the clutch, a task which he might forget or neglect to perform.

It will further be observed that the cycle of substituting the operator's mental influence for the influence that is responsive to speed or load, and then permitting the latter influence to become operative once more, is accomplished through but one movement, namely, movement of lever 42 to the point desired. This act accomplishes the first part of the cycle, and simple release of lever 42 permits the other part of the cycle to be accomplished.

What I claim is:

1. In combination, a rotatable rod, a stationary element having a slot, a resiliently flexible lever on said rod and extending through said slot and adapted to move in said slot upon rotation of said rod, end walls of said slot being spaced apart to provide a pair of abutments located in the normal plane of said lever and spaced apart sufficiently to permit a predetermined amount of movement of said lever and a predetermined fraction of a revolution of said rod, a wall of said slot having an abutment between said first two abutments and positioned out of the plane of movement of said lever, said lever being adapted to be flexed out of its normal plane and into the plane of said last named abutment upon application of manual pressure thereto.

2. In combination, a rotatable rod, a stationary element having a slot, a resiliently flexible lever on said rod and extending through said slot and adapted to move in said slot upon rotation of said rod, end walls of said slot being spaced apart to provide a pair of abutments located in the normal plane of said lever and spaced apart sufficiently to permit a predetermined amount of movement of said lever and a predetermined fraction of a revolution of said rod, a wall of said slot having an abutment between said first two abutments and positioned out of the plane of movement of said lever, said lever being adapted to be flexed out of its normal plane and into the plane of said last named abutment upon application of manual pressure thereto, said stationary element having a second slot adjacent to one of said ends, the said second slot being located out of the normal plane of movement of said lever and being adapted to receive said lever upon application of manual pressure thereto sufficient to flex it into the plane of the second named slot whereby to permit a continuation in the movement of said lever.

TRACY BROOKS TYLER.